(12) United States Patent
Kwok et al.

(10) Patent No.: US 10,057,393 B2
(45) Date of Patent: Aug. 21, 2018

(54) CODEC-SPECIFIC RADIO LINK ADAPTATION

(71) Applicant: T-Mobile USA, Inc., Bellevue, WA (US)

(72) Inventors: Ming Shan Kwok, Seattle, WA (US); Mark McDiarmid, Seattle, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 79 days.

(21) Appl. No.: 15/091,476

(22) Filed: Apr. 5, 2016

(65) Prior Publication Data

US 2017/0289319 A1 Oct. 5, 2017

(51) Int. Cl.
| | |
|---|---|
| *H04L 29/06* | (2006.01) |
| *H04W 24/02* | (2009.01) |
| *H04W 76/10* | (2018.01) |
| *G10L 19/24* | (2013.01) |
| *G10L 19/005* | (2013.01) |
| *H04W 88/08* | (2009.01) |

(Continued)

(52) U.S. Cl.
CPC .......... *H04L 69/22* (2013.01); *H04L 65/1016* (2013.01); *H04L 65/607* (2013.01); *H04W 24/02* (2013.01); *H04W 76/10* (2018.02); *G10L 19/005* (2013.01); *G10L 19/18* (2013.01); *G10L 19/24* (2013.01); *H04W 28/0252* (2013.01); *H04W 88/08* (2013.01)

(58) Field of Classification Search
CPC ... H04L 69/22; H04L 65/608; H04L 65/1016; H04L 61/2007; H04L 65/607; H04W 24/02; H04W 76/02; H04W 76/10; H04W 88/08; H04W 28/0252; G10L 19/24; G10L 19/005; G10L 19/18

See application file for complete search history.

(56) References Cited

U.S. PATENT DOCUMENTS 8,830,863 B2 * 9/2014 Novak ................. H04W 36/06
  370/252
8,893,204 B2 * 11/2014 Levin ............. H04N 21/234309
  348/14.09

(Continued)

FOREIGN PATENT DOCUMENTS

WO WO2015080658 6/2015
WO WO2015163750 10/2015

OTHER PUBLICATIONS

PCT Search Report and Written Opinion dated Jul. 19, 2017 for PCT Application No. PCT/US17/25863, 13 pages.

*Primary Examiner* — Brian O'Connor
(74) *Attorney, Agent, or Firm* — Lee & Hayes, PLLC

(57) ABSTRACT

A codec-specific radio link adaptation procedure can be implemented at the radio access network (RAN) level. A process includes receiving, from a mobile device, a bitstream carrying speech data as part of a communication session, determining, based at least in part on a result of inspecting packets of the bitstream or a notification message from an Internet Protocol (IP) Multimedia Subsystem (IMS) core, that the bitstream is associated with a codec that provides improved performance of the mobile device as compared to legacy codecs in similar radio conditions; and adapting a radio link for the communication session according to the codec.

20 Claims, 5 Drawing Sheets

(51) Int. Cl.
   *H04W 28/02*      (2009.01)
   *G10L 19/18*      (2013.01)

(56)          References Cited

U.S. PATENT DOCUMENTS

| | | | |
|---|---|---|---|
| 9,026,434 B2 * | 5/2015 | Greer | G10L 19/24 |
| | | | 370/287 |
| 9,161,286 B2 * | 10/2015 | Enstrom | H04W 36/385 |
| 9,286,905 B2 * | 3/2016 | Greer | G10L 19/24 |
| 9,444,679 B2 * | 9/2016 | Cabrera | H04L 41/08 |
| 9,728,193 B2 * | 8/2017 | Greer | G10L 19/24 |
| 9,807,592 B2 * | 10/2017 | Ramamurthi | H04W 8/18 |
| 9,812,134 B2 * | 11/2017 | Garre | G10L 19/002 |
| 2006/0067324 A1 | 3/2006 | Kim et al. | |
| 2007/0073535 A1 | 3/2007 | Chen et al. | |
| 2015/0207827 A1 * | 7/2015 | Jheng | H04W 36/0022 |
| | | | 370/260 |
| 2015/0228291 A1 | 8/2015 | Greer et al. | |
| 2016/0196827 A1 * | 7/2016 | Greer | G10L 19/24 |
| | | | 704/229 |
| 2017/0237783 A1 * | 8/2017 | Yang | H04L 65/1083 |
| | | | 370/331 |
| 2017/0303114 A1 * | 10/2017 | Johansson | G10L 19/002 |

\* cited by examiner

CODEC-SPECIFIC RADIO LINK ADAPTATION

BACKGROUND

As cellular technologies continue to evolve, cellular networks remain "heterogeneous" in the sense that they support both legacy technologies and new technologies. These heterogeneous networks allow legacy devices to communicate with newer devices. Still, the new technologies can provide improved performance to mobile devices that support the new technologies. For example, a new mobile device that is capable of using a super wideband audio codec, such as Enhanced Voice Services (EVS), for a voice call is capable of providing clearer-sounding calls, and/or extended range for the voice call, which can allow a user to continue a voice communication session at a greater distance from the serving access point (AP) or in much poorer radio conditions as compared to other, legacy audio codecs, such as the Adaptive Multi-Rate (AMR) audio codec.

However, the performance improvements that new technologies are capable of providing are not being fully realized in current cellular networks. As an illustrative example, consider a cellular network supporting both EVS and AMR audio codecs. Whether a mobile device is employing an EVS codec or an AMR codec during an ongoing communication session is generally known to the Internet Protocol (IP) Multimedia Subsystem (IMS) core network (sometimes referred to as the "IMS core", or the "Core Network (CN)") via the application layer, but the same is not true for the radio access network (RAN) used to connect the mobile device to the IMS core. In fact, the RAN is "codec-agnostic" in the sense that the bitstreams flowing through the RAN are not treated differently based on the codecs associated with those bitstreams. There is currently no way for components at the RAN level to differentiate between an AMR bitstream and an EVS bitstream. As a consequence, radio control parameters that are designed for AMR voice traffic are utilized at the RAN level for all bitstreams carrying speech data, and, as a consequence, the performance improvements that new technologies are capable of providing are not fully realized for the new mobile devices that support them.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
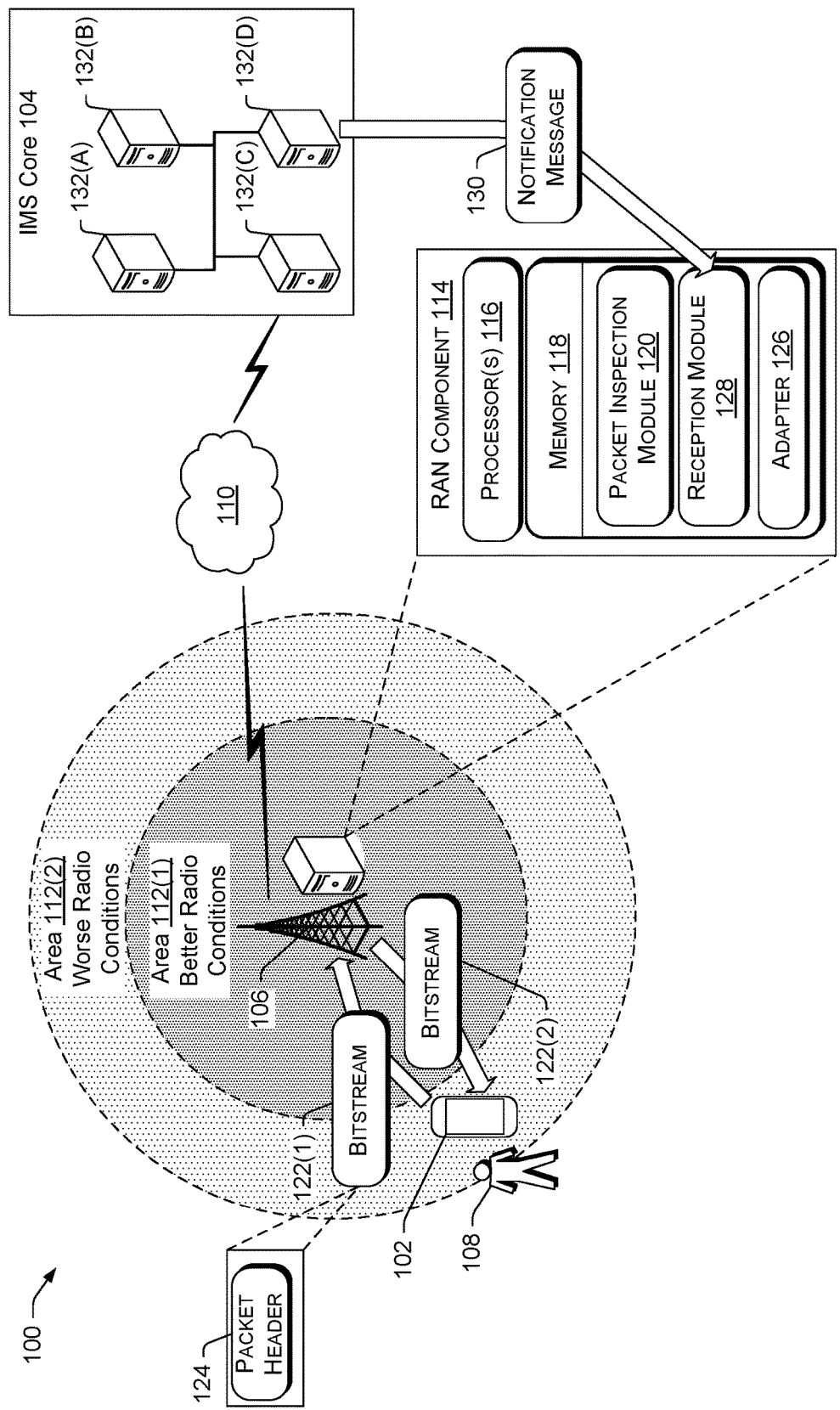
FIG. 1 illustrates an example cellular network environment for implementing codec-specific radio link adaptation.

Newer mobile devices, such as fourth generation (4G) Long Term Evolution (LTE)-compliant mobile devices, are configured to employ the latest audio and video codecs to establish voice and video communication sessions. With respect to audio codecs, for example, some newer mobile devices are configured to support Enhanced Voice Services (EVS), which is an audio codec defined in the 3rd Generation Partnership Project (3GPP) standard for provisioning voice over LTE (VoLTE) services. The EVS audio codec can use a higher sampling rate as compared to its predecessor audio codecs, which allows for new wideband audio technologies, such as high definition (HD) voice (sometimes referred to as "HD calling").

The improved coding scheme of EVS not only provides clearer-sounding calls, but also enables the calls to stay in good quality in relatively poor radio conditions. This means that the EVS audio codec can extend the voice call range for the mobile device, which allows a user to continue a voice communication session at a greater distance from the serving AP, or in much poorer radio conditions served by an AP, as compared to other audio codecs, such as the Adaptive Multi-Rate (AMR) audio codec. In general, as cellular networks continue to evolve, newer technologies can provide enhancements that allow for improved performance of the devices that utilize the cellular networks as compared to the performance that legacy technologies can provide.

Still, there is a transition period as legacy technologies phase out and as new technologies are adopted, which causes cellular networks to remain "heterogeneous" with a mixture of legacy and non-legacy technologies. In other words, not all user equipments (UEs) are capable of supporting the latest technologies, such as the EVS audio codec. These UEs that cannot support the latest technologies are referred to as "legacy devices." As a result, some voice communication sessions are encoded/decoded using the EVS audio codec, while other voice communication sessions—particularly those involving legacy devices—can be encoded/decoded using a different audio codec, such as AMR, AMR Wideband (AMR-WB). When an EVS-capable device is communicating with an AMR-capable device, transcoding may allow for translation between the different codecs to enable the communication session.

Described herein are techniques and systems for adapting a radio link for a communication session according to a codec employed by a mobile device involved in the communication session. The techniques and systems described herein are aimed at leveraging the performance enhancements gained by newer codecs, such as the EVS audio codec, in the implementation of a codec-specific radio link adaptation procedure. For example, since the EVS audio codec provides, among other things, error-combating features that improve voice quality in relatively poor radio conditions as compared to legacy audio codecs, a radio access network (RAN) component can dynamically adapt the radio link used for a communication session when it is determined that a mobile device involved in the communication session is employing the EVS codec. Here the adaptation of the radio link can involve adjusting one or more radio control parameters to adapt the radio link to an EVS coding scheme. Otherwise, when it is determined that a mobile device involved in a communication session is employing a legacy codec (e.g., AMR-WB), the radio link is not adapted, and default radio control parameters are utilized for a legacy coding scheme. Accordingly, by determining the codec employed by a mobile device at the RAN level, the RAN can differentiate customers/devices according to codec in order to leverage the performance enhancements of newer codecs at the RAN level.

In some embodiments, a process to be implemented at a RAN component includes receiving, from a mobile device, a bitstream carrying speech data as part of a communication session, determining, based at least in part on (i) a result of inspecting packets of the bitstream or (ii) a notification message from an Internet Protocol (IP) Multimedia Subsystem (IMS) core, that the bitstream is associated with a codec that provides improved performance of the mobile device as compared to legacy codecs in similar radio conditions, and adapting a radio link for the communication session according to the codec. It is to be appreciated that the techniques and systems described herein can apply to any form of network adaptation to treat voice sessions differently based on different codecs utilized in the voice sessions so that the benefits brought-in by those codecs can be realized.

Also disclosed herein are systems comprising one or more processors and one or more memories, as well as non-transitory computer-readable media storing computer-executable instructions that, when executed, by one or more processors perform various acts and/or processes disclosed herein.

By implementing a codec-specific radio link adaptation procedure, a mobile device can take full advantage of the performance enhancements provided by newer codecs, such as extended voice calling range provided by the channel-aware EVS audio codec. In this manner, a user can remain on a session longer in poor radio conditions where voice quality significantly degrades using legacy codecs. This, in turn, improves the reliability and functionality of cellular networks. By the use of the techniques disclosed herein, one or more devices can be configured to conserve resources with respect to power resources, memory resources, communications bandwidth resources, processing resources, and/or other resources while providing mechanisms for codec-specific radio link adaptation. Technical effects other than those mentioned herein can also be realized from an implementation of the technologies disclosed herein.

Example Environment

FIG. 1 illustrates an example cellular network environment 100 for implementing codec-specific radio link adaptation. As shown in FIG. 1, a mobile device 102 is configured to communicate with, and connect to, an IMS core 104 through an access point (AP) 106 that is part of a radio access network (RAN). The mobile device 102 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), and/or any similar mobile device 102. In accordance with various embodiments described herein, the terms "wireless communication device," "wireless device," "communication device," "mobile device," and "user equipment (UE)" may be used interchangeably herein to describe any mobile device 102 involved in the techniques described herein. The mobile device 102 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Institute of Electrical and Electronics Engineers (IEEE) 802.1x protocols, WiMAX, wireless fidelity (Wi-Fi™), and/or any future IP-based network technology or evolution of an existing IP-based network technology.

FIG. 1 further illustrates a user 108 who is associated with the mobile device 102. The user 108 may have subscribed to services that a carrier (or cellular network operator) provides to its customers. Such a carrier may utilize the IMS core 104 for delivering IP multimedia to UEs of its customers, such as the mobile device 102 associated with user 108. The IMS core 104 permits UEs, such as the mobile device 102, to conduct voice and data communication sessions over the IMS core 104.

In the example of FIG. 1, the AP 106 is in the form of a cellular-based AP (e.g., a base station or enhanced NodeB (eNodeB)). In this manner, the user 108 (or subscriber) may access services from the IMS core 104 using the mobile device 102 that communicates with the IMS core 104 through the AP 106 acting as a serving AP 106 during an ongoing communication session. The AP 106 can be connected to, and communicate with, the IMS core 104, via a network 110, such as a dedicated backhaul or similar mobile telephony network, and the network 110 may be wired, wireless, or a combination thereof. The network 110 may include intermediary components that may include, without limitation, a Gateway GPRS Support Node (GGSN), Serving GPRS Support Node (SGSN), or similar components that facilitate mobility management, session management, and transport for IP packet services. It is to be appreciated that, although the example AP 106 is shown in FIG. 1 in the form of a base station, other types of APs 106 can be utilized with the techniques and systems herein, such as a Wi-Fi AP that connects to the IMS core 104 over a public network, such as the Internet, that makes up the RAN. Moreover, the AP 106 in FIG. 1 may be capable of communicating wirelessly using a cellular-based wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE, IEEE 802.1x protocols, WiMAX, Wi-Fi, and/or any future IP-based network technology or evolution of an existing IP-based network technology.

The AP 106 is shown as having a limited coverage area in terms of the geographical area or space in which the mobile device 102 can effectively access the IMS core 104 via the AP 106, which can be due in part to propagation loss of radio signals that increases with increased distance from the serving AP 106. Accordingly, when the mobile device 102 is within a first area 112(1) having relatively good radio conditions, the mobile device 102, as well as most other mobile devices, may experience reasonably good call quality, regardless of the codec employed by the mobile device 102. For example, if the mobile device 102 is not capable of employing the EVS audio codec and is located in the first area 112(1), the call quality during a communication session may be at an acceptable level to carry on a communication session. However, if the mobile device 102 that is not capable of employing the EVS audio codec moves to a second area 112(2) having poor radio conditions, the call quality may degrade to a level that is unacceptable, making it difficult or impossible to continue the communication session (e.g., the communication session might be dropped). By contrast, if the mobile device 102 is capable of employing the EVS audio codec and is located in the second area 112(2) having poor radio conditions, the mobile device 102 may experience reasonably good call quality to remain on the communication session because of a RAN component 114 that implements a radio link adaptation procedure, as described herein.

It is to be appreciated that other components (not shown) in addition to the AP 106 and the RAN component 114 can make up the RAN. Furthermore, the techniques and systems are not limited to the implementation shown in FIG. 1, which is presented merely for illustrative purposes as an example implementation. The RAN component 104 is shown as being equipped with one or more processors 116 and one or more forms of computer-readable memory 118, which will be described in more detail below with reference to FIG. 2.

The computer-readable memory 118 may include a packet inspection module 120 configured to inspect packets within a bitstream, such as the bitstream 122(1) for the uplink and/or the bitstream 122(2) for the downlink (collectively bitstreams 122). The bitstreams 122 can comprise a series of digital bits that represent a voice signal transmitted as part of a voice communication session, which can be compressed into fewer bits and formatted into a series of packets per the audio codec being employed. A "packet" in such a bitstream 122 is typically a grouping of bits comprising at least one packet header 124 containing signaling information. The packet can include additional portions, such as a payload portion containing the speech data being conveyed during the communication session. In some embodiments, the packet header 124 comprises a Real-time Transport Protocol (RTP) payload header of an RTP packet. The RTP payload headers within the bitstream 122 can be indicative of the codec employed by the mobile device 102. This is because the RTP payload header for an AMR-WB bitstream 122 has a different length (e.g., number of bits) than the length of the RTP payload header for an EVS bitstream 122. In this manner, the packet inspection module 120 can inspect the packets in the bitstream 122 to categorize the bitstream 122 as being associated with one of multiple possible codecs according to the structure (e.g., length) of the packet header 124. In some embodiments, contents of the packet header 124 can additionally, or alternatively, be examined to determine the codec associated with the bitstream 122.

In an illustrative example, an EVS bitsream 122 can include RTP packets with an RTP payload format that includes one of a Compact format or a Header-Full format that are used depending on the required functionalities within a communication session and whether a single frame is transmitted. These two formats for the RTP payload can be switched during a session, but the format of the RTP payload can also be restricted to exclusively use the Header-Full format, in some implementations. The Compact format for the RTP payload in an EVS bitstream 122 can be used when exactly one coded frame is included in the RTP payload, and, in this format, the coded frame follows the RTP header without any additional EVS RTP payload header. The Header-Full format for the RTP payload in an EVS bitstream 122 can be used when one or more coded frames are included in the RTP payload, and, in this format, the RTP packet will include an RTP payload header (an RTP payload header is an example of the packet header 124). The RTP payload header in the Header-Full format of the RTP payload in an EVS bitstream 122 can comprise a Table of Content (ToC) byte or a Codec Mode Request (CMR) byte. Therefore, in at least one instance, the RTP payload header (an example of the packet header 124) can be a byte in length for an EVS bitstream 122.

In light of the various types of RTP payload formats for an EVS bitstream 122, some of which may include an RTP payload header, and in light of the different lengths (e.g., number of bits) between an EVS RTP payload header and an AMR RTP payload header, an example packet inspection technique implemented by the packet inspection module 120 can comprise inspecting/examining a plurality of packets (e.g., 100 sequential or randomly sampled packets) in the bitstream 122 for an ongoing communication session, and determining if there is a correlation between the length of the packet headers 124 (e.g., RTP payload headers) in the plurality of packets that is indicative of an EVS codec. For example, a correlation can be determined if a threshold number or percentage (e.g., 80%, 90%, etc.) of the RTP payload headers in the examined packets are a byte in length. In some embodiments, the packet inspection module 120 can be a trained machine learning model that is trained up with historical bitstream/packet data to learn the packet header 124 lengths that are indicative of an EVS bitstream 122.

A result of the inspection of the packet(s) by the packet inspection module 120 may be that the packet headers 124 are either characteristic of a codec that provides improved performance of the mobile device 102 as compared to legacy codecs in similar radio conditions, such as the EVS codec, or characteristic of a legacy codec, such as the AMR codec. Depending on the result of the packet inspection, an adapter 126 can be used to adapt a radio link for the communication session. That is, if the result of the inspection is that the packet headers 124 are characteristic of a codec that provides improved performance of the mobile device 102 as compared to legacy codecs in similar radio conditions, such as the EVS codec, the adapter 126 can adapt the radio link for the communication session according to the codec by adjusting one or more radio control parameters according to the codec. For example, the adapter 126 can adjust a bit-rate to be used in the communication session, an audio bandwidth to be used in the communication session, a number of audio channels to be used in the communication session, a value for a channel-aware mode, or any other suitable radio control parameter or combination of parameters. In this manner, the performance enhancements provided by a newer audio codec, such as the EVS codec, can be fully realized, which can provide a more reliable cellular network for the EVS-capable mobile device 102 in poor radio conditions. If, on the other hand, the result of the inspection is that the packet headers 124 are characteristic of a legacy codec, such as the AMR codec, the radio link is not adapted, and the default radio control parameters are utilized to provide the best available performance for the mobile device 102.

In some embodiments, the computer-readable memory 118 includes a reception module 128 configured to receive a notification message 130 from the IMS core 104 over the network 110. The IMS core 104 may include multiple nodes 132 that are configured for various purposes, such as control and management of communication sessions on the IMS core 104. FIG. 1 illustrates four nodes 132(A)-(D), but any number of nodes 132 less than or greater than four may be utilized in the IMS core 104. Individual ones of the nodes 132 may represent various Call Session Control Functions (CSCF) that provide control-level functionality, such as a proxy CSCF (P-CSCF), an interrogating CSCF (I-CSCF), a serving CSCF (S-CSCF), an emergency CSCF (E-CSCF), and the like. Other ones of the nodes 134 may represent a security gateway (SEG), a session border controller (SBC), a home subscriber server (HSS), and/or an application server, such as a Telephony Application Server (TAS).

One or more of the nodes 132 in the IMS core 104 can be configured to analyze application layer information for a communication session to determine a codec employed by one or more mobile devices 102 involved in the communication session. Accordingly, the notification message 130 can include an identifier (e.g., an Internet Protocol (IP) address) associated with the mobile device 102 and a codec that is employed by the mobile device 102 for carrying on the communication session over the IMS core 104. The reception module 128 can be configured to receive, from the IMS core 104, the notification message 130 and determine, based at least in part on the notification message 130, that the bitstream 122 flowing through the RAN from or to the mobile device 102 is associated with a codec specified in the notification message 130. For example, the reception module 128 may be configured to extract the codec specified in the notification message 130 and associate the codec with the identifier (e.g., IP address) in the notification message 130 to determine that the bitstream 122(1) coming from the mobile device 102 and/or the bitstream 122(2) sent to the mobile device 102 is associated with the codec.

If the codec in the notification message corresponds to a codec that provides improved performance of the mobile device as compared to legacy codecs in similar radio conditions, such as the EVC codec, the adapter 126 can be used to adapt a radio link for the communication session by adjusting one or more radio control parameters according to the codec. For example, the adapter 126 can adjust a bit-rate to be used in the communication session, an audio bandwidth to be used in the communication session, a number of audio channels to be used in the communication session, a value for a channel-aware mode, or any other suitable radio control parameter or combination of parameters. In this manner, the performance enhancements provided by a newer audio codec, such as the EVS codec, can be fully realized, which can provide a more reliable cellular network for the EVS-capable mobile device 102 in poor radio conditions. If, on the other hand, the codec specified in the notification message 130 is a legacy codec, such as the AMR codec, the radio link is not adapted, and the default radio control parameters are utilized to provide the best available performance for the mobile device 102. In some embodiment, the reception module 128 stores a mapping of the association between the identifier and the codec within the notification message 130. In this manner, the user 108 associated with the mobile device 102 can be differentiated from other customers that use mobile devices employing legacy codecs, and can benefit from the performance enhancements of the newer technologies his/her mobile device 102 is capable of.

Figure 2:
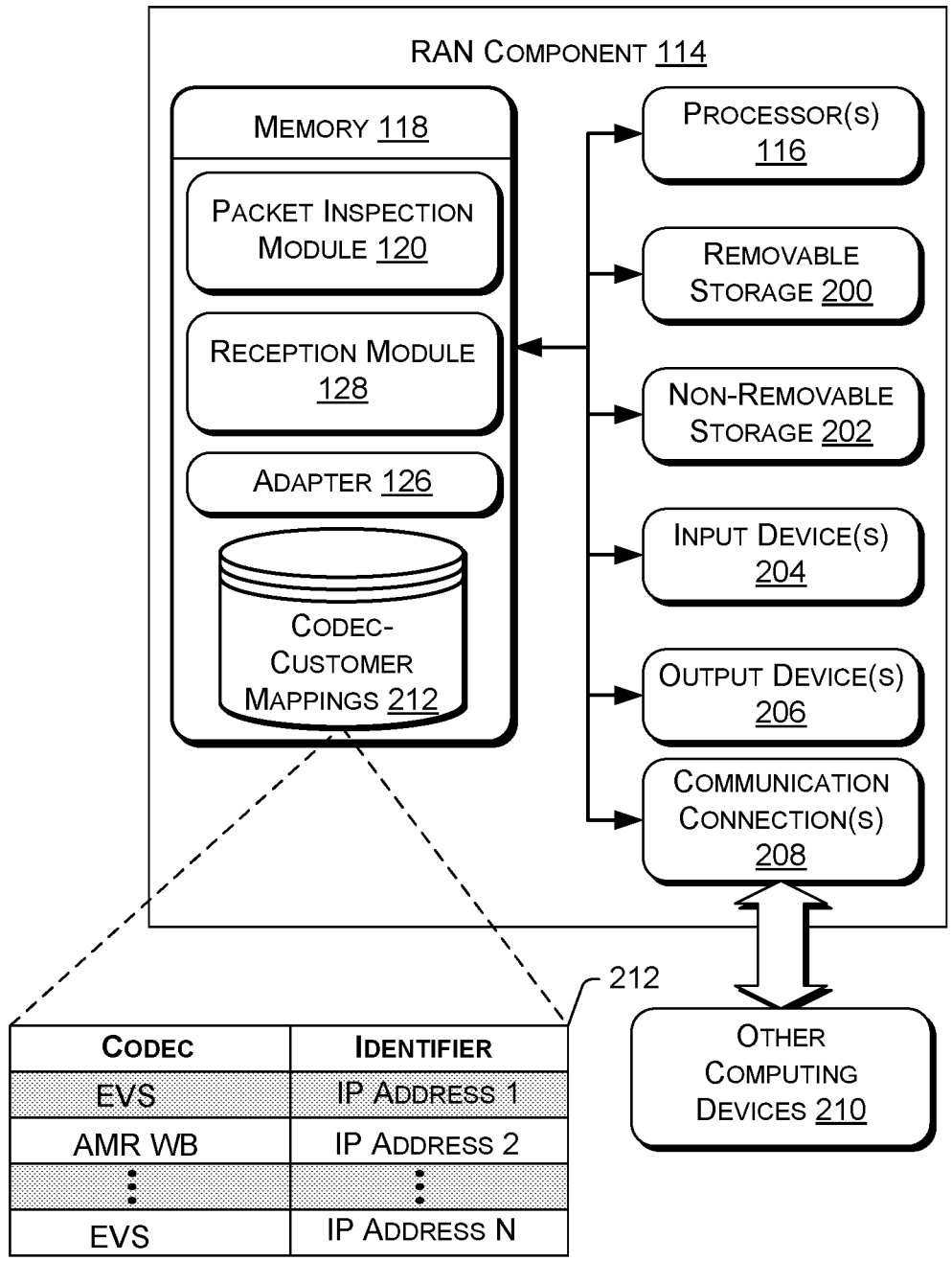
FIG. 2 is a block diagram of an example RAN component architecture in accordance with various embodiments.

FIG. 2 is a block diagram of an example architecture of the RAN component 114 of FIG. 1 in accordance with various embodiments.). The RAN component 114 may be implemented as any suitable computing device, including, without limitation, a server computer, a cluster of server computers, and/or any similar computing device. As described with reference to FIG. 1, the RAN component 114 may include one or more processors 116 and one or more forms of computer-readable memory 118. The RAN component 114 may also include additional storage devices. Such additional storage may include removable storage 200 and/or non-removable storage 202.

In various embodiments, the computer-readable memory 118 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 118 may also be described as computer storage media and may include volatile and nonvolatile, removable and non-removable media implemented in any method or technology for storage of information, such as computer readable instructions, data structures, program modules, or other data. Computer-readable memory 118, as well as the removable storage 200 and non-removable storage 202, are all examples of non-transitory computer-readable storage media. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the RAN component 114. Any such non-transitory computer-readable storage media may be part of the RAN component 114.

The RAN component 114 may further include input devices 204, such as buttons (e.g., keyboard or keypad), and output devices 206, such as a display. The RAN component 114 may further include communications connection(s) 208 that allow the RAN component 114 to communicate with other computing devices 210 such as the mobile device 102, a node(s) 132 of the IMS core 104, and so on. The communications connection(s) 208 may facilitate transmitting and receiving wireless and/or wired signals over any suitable wireless and/or wired communications/data technology, standard, or protocol, as described above, such as using licensed, semi-licensed, or unlicensed spectrum over a telecommunications network.

As described with reference to FIG. 1, the computer-readable memory 118 may include the packet inspection module 120, the reception module 128, and the adapter 126. The adapter 126 can be utilized with either or both of the packet inspection module 120 and/or the reception module 128 to determine a codec associated with a bitstream 122 of an ongoing communication session and adapt a radio link for the communication session, if necessary. For example, if the codec is a codec that provides improved performance of the mobile device 102 as compared to legacy codecs in similar radio conditions, such as the EVS codec, the adapter 126 can adjust one or more radio control parameters according to the codec, such as a bit-rate, an audio bandwidth, a number of audio channels, a value of a channel-aware mode, and so on. This can provide the performance enhancements of an advanced audio codec to the mobile device 102 at the RAN level.

FIG. 2 also shows code-to-customer mappings 212 that can be created and stored in a data store, or any suitable data repository in order to differentiate customers or mobile devices 102 according to codec. For example, the mappings 212 may include individual mappings from an IP address of a particular mobile device 102 to an audio codec employed by the mobile device 102. These audio codecs can be determined by the packet inspection module 120 during a packet inspection process and/or the reception module 128 based on the notification messages 130 received from the IMS core 104.

Figure 3:
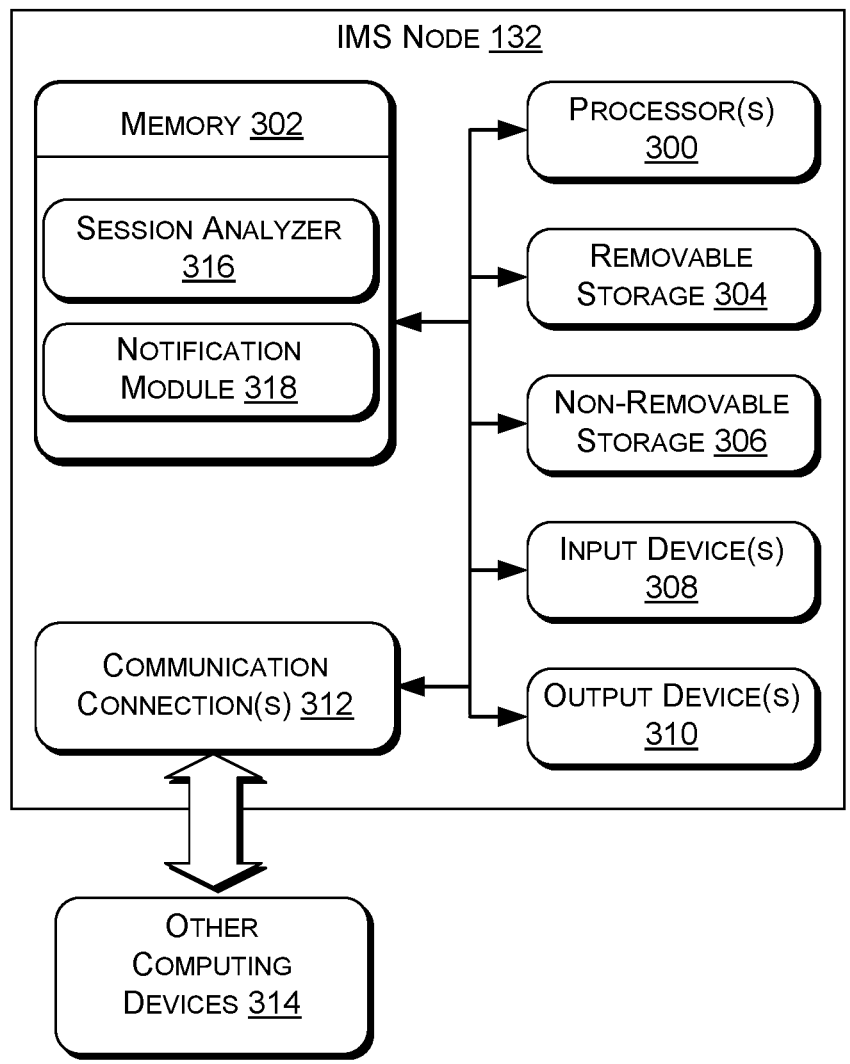
FIG. 3 is a block diagram of an IMS node architecture in accordance with various embodiments.

FIG. 3 is a block diagram of an IMS node 132 within the IMS core 104 that is configured to transmit the notification message 130 to the RAN component 114 for purposes of adapting a radio link according to a determined codec. The IMS node 132 can represent any suitable type of IMS node 132 of the IMS core, such as an application server (TAS), a CSCF node, and the like. As shown, the IMS node 132 may include one or more processors 300 and one or more forms of computer-readable memory 302. The IMS node 132 may also include additional storage devices. Such additional storage may include removable storage 304 and/or non-removable storage 306. The computer-readable memory 302, as well as the removable storage 304 and non-removable storage 306 may comprise any of the types of non-transitory computer-readable storage media described with reference to the RAN component 114 of FIG. 2.

The IMS node 132 may further include input devices 308, such as buttons (e.g., keyboard or keypad), and output devices 310, such as a display. The IMS node 132 may further include communications connection(s) 312 that allow the IMS node 132 to communicate with other computing devices 314 the RAN component 114, the AP 106, and so on. The communications connection(s) 312 may facilitate transmitting and receiving wireless signals over any suitable wireless and/or wireline communications/data technology, standard, or protocol, as described above, such as using licensed, semi-licensed, or unlicensed spectrum over a telecommunications network.

In some embodiments, the computer-readable memory 302 may include a session analyzer 316 configured analyze an ongoing communication session at the application layer within the IMS core 104. For example, the session analyzer 316 can retrieve, from the packets flowing through the IMS core 104 in the application layer, information regarding the codec employed by one or more of the mobile devices 102 involved in the communication session. In addition, the session analyzer 316 can retrieve an identifier(s) (e.g., IP address) of one or more of the mobile devices 102 involved in the communication session so that the identifiers can be associated with the employed codec and included in the notification message 130.

A notification module 318 is configured to transmit the notification message 130 including the identifier and the codec determined by the session analyzer 316 to the RAN component 114 for purposes of dynamic radio link adaptation according to the codec in the notification message 130. The notification module 318 may transmit the notification message 130 via an operation support system (OSS) for the RAN, or any other suitable transmission channel.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
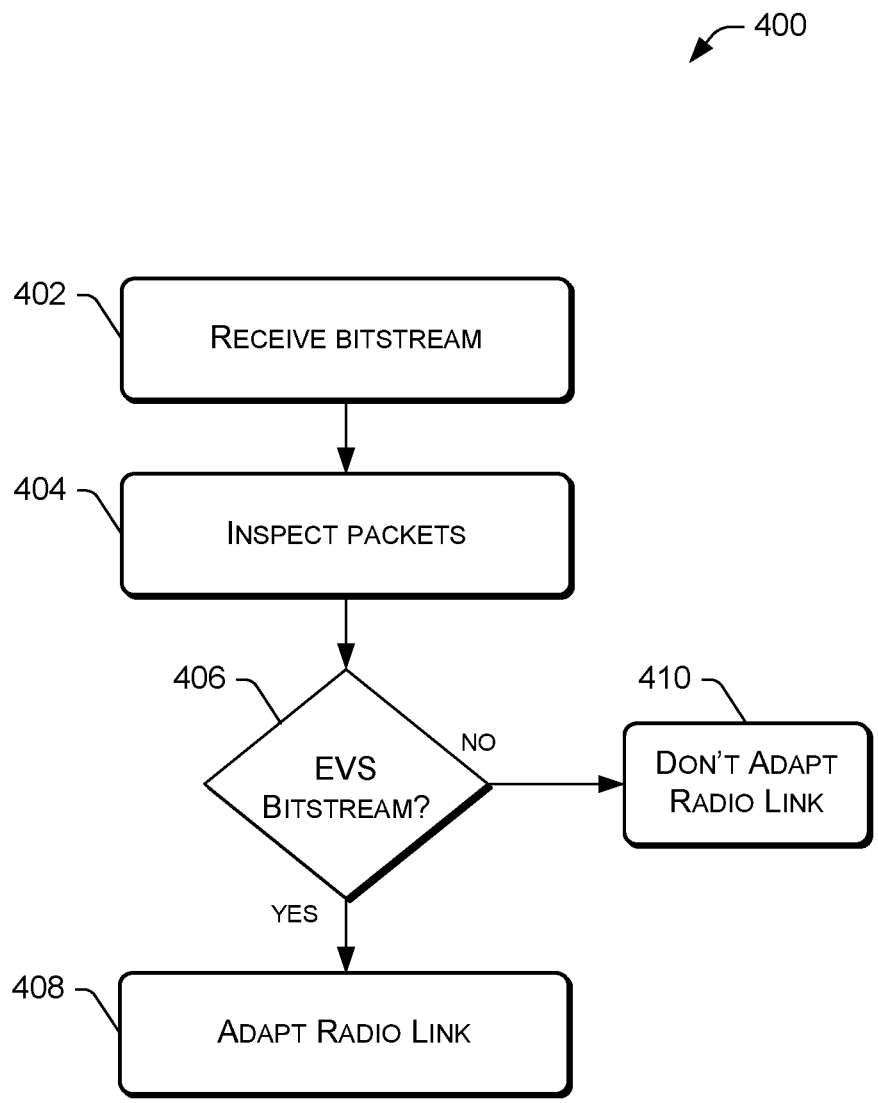
FIG. 4 illustrates a flowchart of an example process for adapting a radio link according to a determined codec based on a packet inspection technique.

FIG. 4 illustrates a flowchart of an example process 400 for adapting a radio link according to a determined codec based on a packet inspection technique. The process 400 may be implemented by the RAN component 114 and relevant components of the RAN component 114, such as the packet inspection module 120, among other components.

At 402, the RAN component 114 can receive a bitstream 122 from a mobile device 102. The bitstream 122 can be formatted into a series of packets carrying speech data as part of a communication session. It is to be appreciated that, prior to receiving the bitstream 122 comprising packets carrying speech data, the mobile device 102 may have performed a registration process for access to a telephony service provided via the IMS core 104, and the communication session may have been initiated and established using Session Initiation Protocol (SIP) messages (e.g., a SIP INVITE method), which is a signaling protocol that can be used to establish, modify, and terminate multimedia sessions over packet networks. The bitstream 122 received at 402 by the RAN component 114 may have been routed through an AP 106, such as a base station.

At 404, the packet inspection module 120 may inspect a plurality of packets within the bitstream 122. For example, the packet inspection module 120 may examine any number of packets (e.g., 100 sequential or randomly sampled packets) by examining packet headers 124 (e.g., RTP payload headers) in the bitstream 122. The inspection at 404 may involve outputting a result of the inspection. The result can be in terms of a particular codec that is determined from contents or structure (e.g., length) of the packet headers 124. For example, the result can be that the packet headers 124 are characteristic of a codec that provides improved performance of the mobile device 102 as compared to legacy codecs in similar radio conditions. For example, the EVS codec provides improved performance of the mobile device 102 as compared to the AMR-WB codec. Thus, the result of the packet inspection at 404 can be that the packet headers 124 are characteristic of the EVS codec, or any future codec that provides improved performance of the mobile device 102 as compared to legacy codecs in similar radio conditions.

In some embodiments, the packet headers 124 comprise RTP payload headers of RTP packets in the bitstream 122, and the inspection of the RTP packets includes examining/analyzing the length of the RTP payload headers. In some embodiments, the packet inspection module 120 can determine if there is a correlation between the length of the packet headers 124 examined at 404 that is indicative of an EVS codec, or any future codec that provides improved performance of the mobile device 102 as compared to legacy codecs in similar radio conditions. A correlation may be determined in this scenario if a threshold number or percentage (e.g., 80%, 90%, etc.) of the packet headers 124 are a predetermined length (e.g., a byte in length).

At 406, a determination is made as to whether the bitstream 122 is associated with the EVS codec (or any future codec that provides improved performance of the mobile device 102 as compared to legacy codes in similar radio conditions). The determination at 406 is based on the result of the packet inspection at 404. That is, if the result of the packet inspection is that the packet header 124 is characteristic of the EVS codec, the determination at 406 is a determination that the bitstream 122 is associated with the EVS codec. In this scenario, the process 400 proceeds down the "yes" path to 408.

At 408, the adapter 126 adapts a radio link for the communication session according to the codec determined at 406 (e.g., the EVS codec, or any future codec that provides improved performance of the mobile device 102 as compared to legacy codecs in similar radio conditions). Adaptation of the radio link at 408 may comprise adjusting a radio control parameter(s) according to the codec determined at 406. For example, the adapter 126 can adjust a bit-rate to be used in the communication session according to an EVS coding scheme, or adjust an audio bandwidth to be used in the communication session according to the EVS coding scheme, and so on. Thus, for EVS-capable mobile devices 102, performance enhancements provided by newer codecs can be realized at the RAN level.

If the determination at 406 is that the bitstream 122 is associated with a legacy codec that the RAN already supports in terms of the radio link, the process 400 proceeds down the "no" path to 410 where the radio link is not adapted. In other words, default radio control parameters that are suitable for legacy codecs can continue to be employed for the radio link of the communication session.

Figure 5:
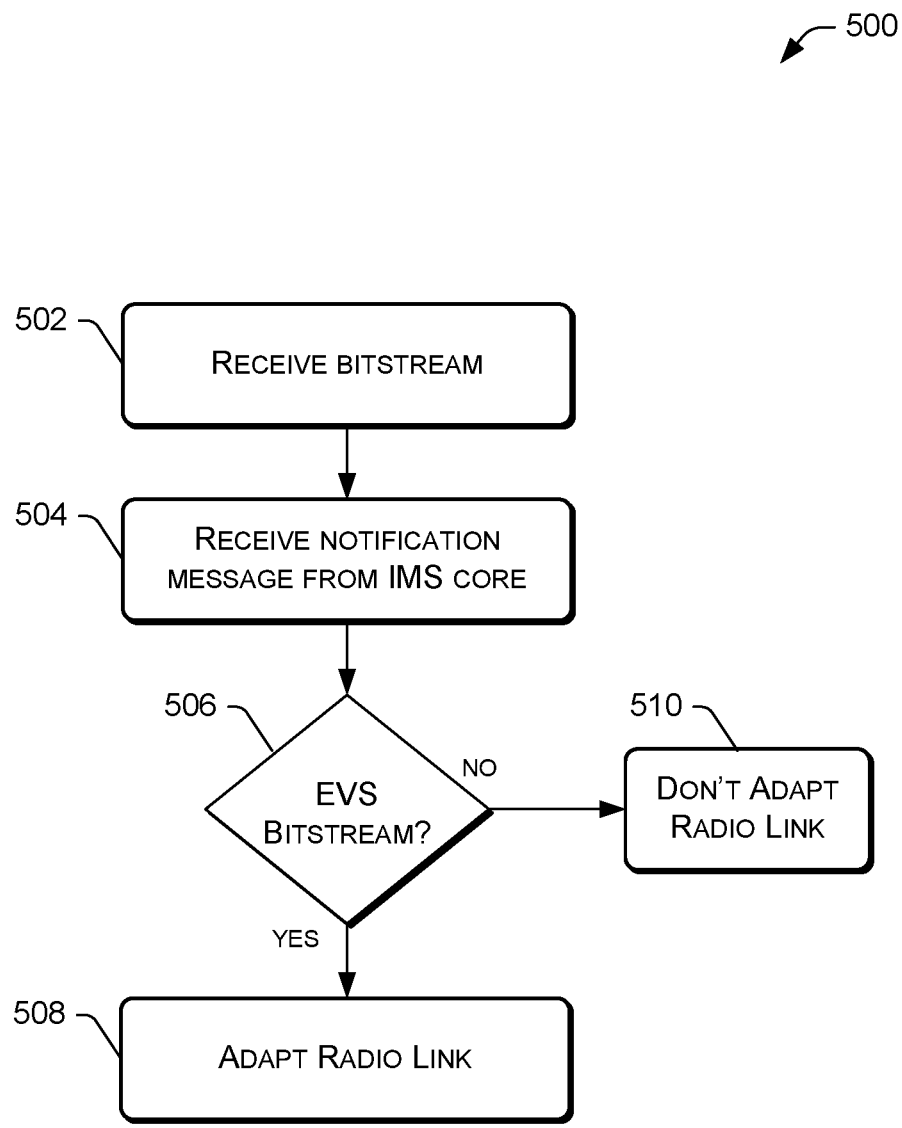
FIG. 5 illustrates a flowchart of an example process for adapting a radio link according to a determined codec based on a notification technique.

FIG. 5 illustrates a flowchart of an example process 500 for adapting a radio link according to a determined codec based on a notification technique. The process 500 may be implemented by the RAN component 114 in conjunction with a node 132 of the IMS core 104 that transmits the notification message 130. Accordingly, the process 500 is discussed with reference to relevant components of the RAN component 114 and the IMS node 132, such as the reception module 128 and the notification module 318, among other components.

At 502, the RAN component 114 can receive a bitstream 122 from a mobile device 102. The bitstream 122 can carry speech data as part of a communication session over the IMS core 104. It is to be appreciated that, prior to receiving the bitstream 122 carrying speech data, the mobile device 102 may have performed a registration process for access to a telephony service provided via the IMS core 104, and the communication session may have been initiated and established using SIP messages (e.g., a SIP INVITE method). The bitstream 122 received at 502 by the RAN component 114 may have been routed through an AP 106, such as a base station.

At 504, the reception module 128 may receive, from the notification module 318 of an IMS node 132, a notification message 130. The notification message 130 received at 504 may include an identifier (e.g., an IP address) associated with the mobile device 102 involved in the communication session and a codec that is employed by the mobile device 102. For example, the session analyzer 316 of the IMS node 132 can determine, from application layer traffic in the IMS core 104, that the mobile device 102 is employing a particular codec, and the notification module 318 can include the particular codec in the notification message 130 along with an identifier that it determines from the application layer traffic.

At 506, a determination is made as to whether the bitstream 122 is associated with the EVS codec (or any future codec that provides improved performance of the mobile device 102 as compared to legacy codes in similar radio conditions). The determination at 506 is based on the codec included in the notification message 130 received at 504. That is, if the notification message 130 includes the EVS codec in association with the identifier of the mobile device 102, the determination at 506 is a determination that the bitstream 122 is associated with the EVS codec. In this scenario, the process 500 proceeds down the "yes" path to 508.

At 508, the adapter 126 adapts a radio link for the communication session according to the codec determined at 506 (e.g., the EVS codec, or any future codec that provides improved performance of the mobile device 102 as compared to legacy codecs in similar radio conditions). Adaptation of the radio link at 508 may comprise adjusting a radio control parameter(s) according to the codec determined at 506. For example, the adapter 126 can adjust a bit-rate to be used in the communication session according to an EVS coding scheme, or adjust an audio bandwidth to be used in the communication session according to the EVS coding scheme, and so on. Thus, for EVS-capable mobile devices 102, performance enhancements provided by newer codecs can be realized at the RAN level.

If the determination at 506 is that the bitstream 122 is associated with a legacy codec that the RAN already supports in terms of the radio link, the process 500 proceeds down the "no" path to 510 where the radio link is not adapted. In other words, default radio control parameters that are suitable for legacy codecs can continue to be employed for the radio link of the communication session.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   receiving, by a radio access network (RAN) component, from a mobile device, a bitstream formatted into a series of packets carrying speech data as part of a communication session;
   inspecting, by the RAN component, the packets of the bitstream;
   determining, by the RAN component, based at least in part on a result of inspecting the packets, that the bitstream is associated with a codec that provides improved performance of the mobile device as compared to legacy codecs in similar radio conditions; and
   adapting, by the RAN component, a radio link for the communication session according to the codec.

2. The computer-implemented method of claim 1, wherein the codec comprises an enhanced voice services (EVS) codec.

3. The computer-implemented method of claim 1, wherein inspecting the packets of the bitstream comprises examining individual lengths of individual packet headers in the packets.

4. The computer-implemented method of claim 3, wherein the individual packet headers comprises Real-time Transport Protocol (RTP) payload headers.

5. The computer-implemented method of claim 3, further comprising determining that a threshold number or percentage of the individual lengths are a predetermined length that is characteristic of the codec.

6. The computer-implemented method of claim 1, wherein adapting the radio link for the communication session according to the codec comprises adjusting a radio control parameter according to the codec.

7. The computer-implemented method of claim 6, wherein the radio control parameter comprises at least one of a bit-rate to be used in the communication session, an audio bandwidth to be used in the communication session, a number of audio channels to be used in the communication session, or a value for a channel-aware mode.

8. A RAN component comprising:
a processor;
memory storing computer-executable instructions that, when executed by the processor, cause the processor to perform operations comprising:
receiving, from a mobile device, a bitstream carrying speech data as part of a communication session;
determining, based at least in part on a result of inspecting packets of the bitstream or a notification message from an Internet Protocol (IP) Multimedia Subsystem (IMS) core, that the bitstream is associated with a codec that provides improved performance of the mobile device as compared to legacy codecs in similar radio conditions, wherein the notification message includes an identifier of the codec; and
adapting a radio link for the communication session according to the codec.

9. The RAN component of claim 8, wherein the codec comprises an enhanced voice services (EVS) codec.

10. The RAN component of claim 8, the operations further comprising inspecting the packets of the bitstream to determine whether the packets include packet headers that are characteristic of the codec, wherein determining that the bitstream is associated with the codec is based at least in part on the result of inspecting the packets.

11. The RAN component of claim 8, wherein the notification message further includes an identifier associated with the mobile device.

12. The RAN component of claim 11, wherein the identifier associated with the mobile device comprises an Internet Protocol (IP) address.

13. The RAN component of claim 8, wherein adapting the radio link for the communication session according to the codec comprises adjusting a radio control parameter according to the codec.

14. A computer-implemented method comprising:
receiving, from a mobile device, a bitstream carrying speech data as part of a communication session over an Internet Protocol (IP) Multimedia Subsystem (IMS) core;
receiving, from the IMS core, a notification message, the notification message including an identifier associated with the mobile device and an identifier of a codec that provides improved performance of the mobile device as compared to legacy codecs in similar radio conditions;
determining, based at least in part on the notification message, that the bitstream is associated with the codec; and
adapting a radio link for the communication session according to the codec.

15. The computer-implemented method of claim 14, wherein the identifier associated with the mobile device comprises an Internet Protocol (IP) address.

16. The computer-implemented method of claim 14, wherein the notification message is received from a component of a control layer of the IMS core.

17. The computer-implemented method of claim 14, wherein the codec comprises an enhanced voice services (EVS) codec.

18. The computer-implemented method of claim 14, further comprising:
associating the identifier associated with the mobile device with the identifier of the codec in a mapping; and
storing the mapping at a component of a radio access network (RAN) serving the mobile device.

19. The computer-implemented method of claim 14, wherein adapting the radio link for the communication session according to the codec comprises adjusting a radio control parameter according to the codec.

20. The computer-implemented method of claim 19, wherein the radio control parameter comprises at least one of a bit-rate to be used in the communication session, an audio bandwidth to be used in the communication session, a number of audio channels to be used in the communication session, or a value for a channel-aware mode.

* * * * *